United States Patent
Colarossi et al.

(10) Patent No.: US 10,583,794 B2
(45) Date of Patent: Mar. 10, 2020

(54) METHOD AND SYSTEM FOR DIAGNOSTIC MEASUREMENT OF FAULT CONDITION FOR COMMON CONNECTED SQUIB LOOPS IN RESTRAINT CONTROL MODULE

(71) Applicant: Autoliv ASP, Inc., Ogden, UT (US)

(72) Inventors: Vincent Colarossi, Dearborn Heights, MI (US); Stuart Koch, West Bloomfield, MI (US)

(73) Assignee: VEONEER US, INC., Southfield, MI (US)

(*) Notice: Subject to any disclaimer, the term of this patent is extended or adjusted under 35 U.S.C. 154(b) by 162 days.

(21) Appl. No.: 15/940,572

(22) Filed: Mar. 29, 2018

(65) Prior Publication Data
US 2019/0299894 A1    Oct. 3, 2019

(51) Int. Cl.
*B60R 21/017* (2006.01)
*B60R 21/01* (2006.01)

(52) U.S. Cl.
CPC ... *B60R 21/0173* (2013.01); *B60R 2021/0115* (2013.01); *B60R 2021/01143* (2013.01); *B60R 2021/01184* (2013.01)

(58) Field of Classification Search
None
See application file for complete search history.

(56) References Cited

U.S. PATENT DOCUMENTS

| | | | |
|---|---|---|---|
| 4,825,148 A | 4/1989 | McCurdy et al. | |
| 5,022,674 A * | 6/1991 | Frantom | B60R 21/272 280/737 |
| 5,452,661 A * | 9/1995 | Neff | F42B 3/16 102/202.14 |
| 5,459,449 A | 10/1995 | Ravas, Jr. et al. | |
| 5,929,367 A * | 7/1999 | Neff | F42B 3/16 102/202.14 |
| 6,530,264 B1 * | 3/2003 | Rink | G01M 3/227 73/40.7 |
| 6,597,181 B2 * | 7/2003 | Boran | B60R 21/0173 324/525 |
| 7,195,280 B2 * | 3/2007 | Wheelwright | B60R 21/2171 280/728.1 |
| 7,210,703 B2 * | 5/2007 | Young | B60R 21/26 102/202.14 |
| 2002/0050826 A1 * | 5/2002 | Boran | B60R 21/0173 324/525 |
| 2005/0225924 A1 * | 10/2005 | Sibrai | B60R 21/0173 361/247 |
| 2005/0225925 A1 * | 10/2005 | Sibrai | B60R 21/0173 361/247 |
| 2006/0087106 A1 * | 4/2006 | Young | B60R 21/26 280/741 |

(Continued)

OTHER PUBLICATIONS

International Search Report for International Application No. PCT/US2019/023363, dated Jun. 11, 2019.

*Primary Examiner* — Shelley Chen
(74) *Attorney, Agent, or Firm* — Brinks Gilson & Lione (57) ABSTRACT

A method and system for diagnosing a fault condition in common connected squib loops is disclosed. A current source supplies current to the feed terminal for the first squib loop and current is returned through the feed terminal for the second squib loop. The voltage is measured between the feed terminal for the first squib loop and the feed terminal for the second squib loop.

15 Claims, 8 Drawing Sheets

(56) References Cited

U.S. PATENT DOCUMENTS

2006/0278281 A1* 12/2006 Gynz-Rekowski ..... E21B 33/10
                                                    137/554
2008/0086250 A1   4/2008 Kuivenhoven
2014/0145725 A1   5/2014 Eiswerth et al.
2015/0343975 A1* 12/2015 Schnetger ........... B60R 21/0173
                                                    701/34.4

* cited by examiner

METHOD AND SYSTEM FOR DIAGNOSTIC MEASUREMENT OF FAULT CONDITION FOR COMMON CONNECTED SQUIB LOOPS IN RESTRAINT CONTROL MODULE

BACKGROUND

The present application relates generally to a method and system for diagnosing a squib loop for the fault condition of a short circuit between critical connections in a common connected pair of squib loops.

An airbag system typically includes a restraint control module, a reaction canister, an air bag, and an inflator with ignitor (squib) that are stored inside the reaction canister. The inflator with squib is connected to the restraint control module via conductive wires and connectors. The total electrical path of these wires and connectors to and from the inflator is termed "squib loop". The restraint control module provides sufficient energy to the inflator through the squib loop to provide airbag actuation. The inflator is actuated by the restraint control module once appropriate signals are received from vehicle sensors sufficient to warrant airbag activation. The restraint control module controls the overall operation of the air bag system and can be viewed as the main control unit for the air bag system.

As with any electrical system that consists of sensors, airbag, wiring and connectors etc, the system requires electrical connections to operate properly. Specifically, in airbag safety systems customers demand that diagnostic capability be implemented in the restraint control module to interrogate the squib loop characteristics, that may prevent the air bag from being activated properly. An example of one squib loop characteristic is the squib resistance measurement between the feed line of one squib loop ($SF_x$) and the second feed line of the second squib loop ($SF_y$) of a common connected pair of squib loops.

BRIEF SUMMARY

A method and system for diagnosing a fault condition in common connected squib loops is disclosed. There are two possible common connections for the squib loops. The first and most popularly used is the common return connected squib loops. The second and not popular at the given time is the common feed connected squib loops.

For a common return connected squib loop, a current source supplies current to the feed terminal for the first squib loop and current is returned through the feed terminal for the second squib loop. The voltage is measured between the feed terminal for the first squib loop and the feed terminal for the second squib loop. The resultant squib loop resistance measured is approximately twice that of an individual squib loop. So the difference between a squib loop resistance measured without a fault and a squib loop resistance measured with a $SF_x$ to $SF_y$ short circuit fault is larger. This then creates a greater sensitivity for the squib loop resistance measurement to detect the $SF_x$ to $SF_y$ short circuit fault condition than using the conventional squib loop resistance measurement on a single individual squib loop (e.g. feed to return).

For a common feed connected squib loop, a current source supplies current to the return terminal for the first squib loop and current is returned through the return terminal for the second squib loop. The voltage is measured between the return terminal for the first squib loop and the return terminal for the second squib loop. The resultant squib loop resistance measured is approximately twice that of an individual squib loop. So the difference between a squib loop resistance measured without a fault and a squib loop resistance measured with a $SR_x$ to $SR_y$ short circuit fault is larger. This then creates a greater sensitivity for the squib loop resistance measurement to detect the $SR_x$ to $SR_y$ short circuit fault condition than using the conventional squib loop resistance measurement on a single individual squib loop (e.g. feed to return).

The resistance for each squib loop may be about 4 Ohms while the resistance between one feed terminal to the other feed terminal may be about 6 Ohms, since both squibs are included in the current path, thereby providing a greater dynamic range to measure the squib loop resistance.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

In the accompanying drawings the components are not necessarily to scale, emphasis instead being placed upon illustrating the principles of the application. Moreover, like reference numerals designate corresponding parts throughout the views.

DETAILED DESCRIPTION

Airbag safety restraint systems typically employ a single inflator device to produce inflation gas for inflating a vehicle occupant restraint airbag the event of a collision. The inflator device is controlled by a squib driver circuit. The squib driver circuit may include a high side driver and as low side driver implemented on a single deployment chip.

Some squib circuits are configured with a common return line. Various manufacturers prefer to minimize the number of module pins from 4 pins to 3 pins and the wiring from 4 wires to 3 wires to support squib loops by connecting the return pins of two squib loops together to support two pyrotechnic loads. This type of connection is called common return line connected squib loop. Common return connected squib loops are beneficial as they reduces the number of module pins needed to support squib loops, so that the same restraint module connector can support more squib loops without module connector/module redesign. Common return line connected squib loops might not beneficial from diagnostic point of view as they are more difficult to diagnose especially for the feed line ($SF_x$) to the feed line ($SF_y$) shorting condition.

The newly proposed diagnostic measurement will provide a more substantially sensitivity squib loop resistance measurement in order to diagnose and detect the feed line ($SF_x$) to feed line ($SF_y$) fault condition in common return line connected squib loops. The concept discussed utilizes the squib resistance diagnostic resources (I_SRM and pulldown current source) and additional multiplexer switches (Mux_CSRx) which connects the squib resistance differential amplifier negative input and the pull-down current source to the first feed terminal ($SF_y$), The diagnostic procedure measures the complete loop resistance between the first feed terminal ($SF_y$) and second feed terminal ($SF_x$) and provides a higher sensitivity to first feed terminal ($SF_y$) to second feed terminal ($SF_x$) fault condition over traditional measurement methods. The concept of the DC biasing is also introduced in the drawing based on the orientation of the measurement and the configuration of the measurement circuit. This new proposal will provide safe diagnostic presence detection of the first feed terminal ($SF_y$) to second feed terminal ($SF_x$) fault conditions. Safe can be interpreted to include that diagnostic fulfills the ignitor No-Fire Limits for both DC and transient limits.

Figure 1:
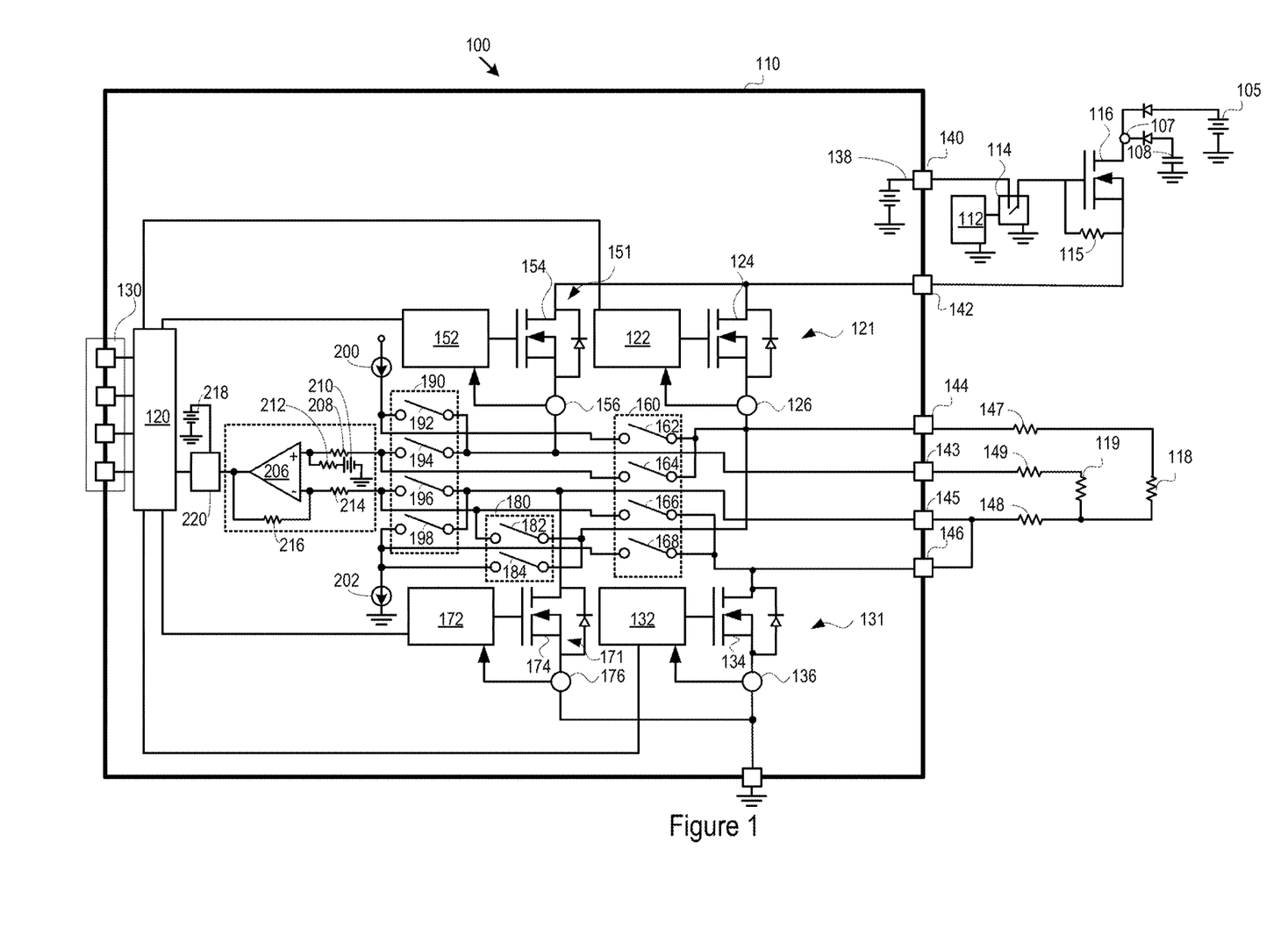
FIG. 1 is a schematic illustration of one implementation of a squib driver circuit.

FIG. 1 is a schematic illustration of a squib deployment system 100. The deployment system includes a deployment chip 110. The deployment chip 110 may be a single silicon chip, for example, an ASIC (Application Specific Integrated Circuit). The deployment chip 110 may include an input terminal ($SS_{xy}$) 142 for receiving an input voltage. The input voltage may be used to fire a deployable restraint such as an air bag. The input terminal ($SS_{xy}$) 142 may receive the input voltage from a battery such as vehicle battery 105. A switch 116 such as the power transistor may be located between the input terminal ($SS_{xy}$) 142 and the battery 105. The battery 105 may be connected to the switch 116 through a diode, further the switch may be connected to an electrical ground though a diode and capacitor ($C_{ER}$) 108, driven by an energy reserve power supply.

The switch 116 may control power provided to the input terminal 142 from the battery 105 as directed by an enable switch 114. The enable switch 114 may receive enable voltage 138 from an output terminal (VSF) 140 of the deployment chip 110. The output voltage may be provided from the output terminal 140 (VSF) to the enable switch 114. The microprocessor control circuit 112 may control the enable switch 114. When the enable switch 114 is active, the enable voltage may be provided to activate switch 116 allowing the battery 105 to provide power to the input terminal ($SS_{xy}$) 142. In some implementations, the enable switch 114 may be connected to the gate of a power transistor thereby acting as a switch or regulator allowing the battery 105 to provide power to the input terminal ($SS_{xy}$) 142. In some implementations, the switch 116 may be an N-channel MOSFET with a drain in connection with the battery 105 and a source in connection with the input terminal ($SS_{xy}$) 142. Resistor 115 may be connected between the source and the gate of switch 116. In this implementation, a resistor may be placed between the gate and source to allow proper operation. The switch 116 can be a MOSFET that provides two functions: Firstly, switch 116 can provide a redundant silicon control path that can prevent deployment in case of system failure where, for example Switch 116 is disabled and switches 124 and 134 of deployment chip 110 become active due to a common failure mode. Secondly, switch 116 can provide a reduced and more controlled V($SS_{xy}$,0) 142 when implemented as a pass element part of a closed loop regulator control path and hence absorb more power and provide a lower level of power dissipation on the expensive ASIC squib driver transistors to minimize system cost.

The input terminal ($SS_{xy}$) 142 may be connected to a first high side driver circuit 121 for a first squib loop. The first high side driver circuit 121 may be connected between the input terminal 142 and the high side feed terminal ($SF_y$) 144. In one implementation, a power transistor 124 may be connected between the input terminal ($SS_{xy}$) 142 and the high side feed terminal ($SF_y$) 144. The power transistor 124 may be an N-channel MOSFET with a drain connected to the input terminal ($SS_{xy}$) 142 and a source connected to the high side feed terminal ($SF_y$) 144. A gate of the power transistor 124 may be connected to a high side gate driver circuit 122. In some implementations, a current sensor 126 may provide a current signal to the high side gate driver circuit 122. The gate driver circuit 122 may utilize the current signal to control activation of the power transistor 124 in response to the amount of current flow. The current sensor 126 may be located between the power transistor 124 and the high side feed terminal ($SF_y$) 144. The high side feed terminal ($SF_y$) 144 may be connected to an ignitor (R_ignitor) 118 through a feed wire (R_Wire_Feed) 147. The current may be returned from the ignitor 118 through a return wire (R_Wire_Return) 148 to a low side return terminal ($SR_y$) 146.

A first low side driver circuit 131 may be connected between the low side return terminal ($SR_y$) 146 and an electrical ground. In one implementation, a power transistor 134 may be connected between the return terminal ($SR_y$) 146 and the electrical ground. The power transistor 134 may be an N-channel MOSFET with a drain connected to the return terminal ($SR_y$) 146 and a source connected to the electrical ground. A gate of the power transistor 134 may be connected to a low side gate driver circuit 132. In some implementations, a current sensor 136 may provide a current signal to the low side gate driver circuit 132. The gate driver circuit 132 may utilize the current signal to control activation of the power transistor 134 in response to the amount of current flow. The current sensor 136 may be located between the power transistor 134 and the electrical ground.

The input terminal ($SS_{xy}$) 142 may be connected to a second high side driver circuit 151. The second high side driver circuit 151 may be connected between the input terminal 142 and the high side feed terminal ($SF_x$) 143. In one implementation, a power transistor 154 may be connected between the input terminal ($SS_{xy}$) 142 and the high side feed terminal ($SF_x$) 143. The power transistor 154 may be an N-channel MOSFET with a drain connected to the input terminal ($SS_{xy}$) 142 and a source connected to the high side feed terminal ($SF_x$) 143. A gate of the power transistor 154 may be connected to a high side gate driver circuit 152. In some implementations, a current sensor 156 may provide a current signal to the high side gate driver circuit 152. The gate driver circuit 152 may utilize the current signal to control activation of the power transistor 154 in response to the amount of current flow. The current sensor 126 may be located between the power transistor 154 and the high side feed terminal ($SF_x$) 143. The high side feed terminal ($SF_x$) 143 may be connected to an ignitor (R_ignitor_2) 119 through a feed wire (R_Wire_Feed_2) 149. The current may be returned from the ignitor 118 through a return wire (R_Wire_Return) 148 to a low side return terminal (SR$_x$) 145.

A second low side driver circuit 171 may be connected between the low side return terminal (SR$_x$) 145 and an electrical ground. In one implementation, a power transistor 174 may be connected between the return terminal (SR$_x$) 145 and the electrical ground. The power transistor 174 may be an N-channel MOSFET with a drain connected to the return terminal (SR$_x$) 145 and a source connected to the electrical ground. A gate of the power transistor 174 may be connected to a low side gate driver circuit 172. In some implementations, a current sensor 176 may provide a current signal to the low side gate driver circuit 172. The gate driver circuit 172 may utilize the current signal to control activation of the power transistor 174 in response to the amount of current flow. The current sensor 176 may be located between the power transistor 174 and the electrical ground.

A digital control circuit 120 may receive commands from a communication interface 130, such as a serial communication interface. The commands provided to the digital circuit 120 through the communication interface 130 may include an enable command, an all fire command, as well as various configuration commands to set timer durations or thresholds for various components such as the high side gate driver 122 or the low side gate driver 132.

The deployment chip 110 may include a test circuit, switch unit 160, switch unit 180, and switch unit 190. The test circuit may include an amplifier 206 with either input being connectable to either the high side feed terminal (SF$_x$) or the low side return terminal (SR$_x$) of either the first squib loop or the high side feed terminal (SF$_y$) or the low side return terminal (SR$_y$) the second squib loop through the switch units 160, 180, and 190.

The switch unit 160 connects or isolates the first squib loop from the test circuit. The switch unit 160 may include a first switch 162 configured to connect or isolate the test circuit (e.g. the current source 200) from the high side feed terminal (SF$_y$) 144 of the first squib loop. The switch unit 160 may include a second switch 164 configured to connect or isolate the test circuit (e.g. the first input of the amplifier 206) from the high side feed terminal (SF$_x$) 144. The switch unit 160 may include a third switch 166 configured to connect or isolate the test circuit (e.g. the second input of the comparator 206) from the low side return terminal (SR$_y$) 146. The switch unit 160 may include a fourth switch 168 configured to connect or isolate the test circuit (e.g. the current source 202) from a low side return terminal (SR$_y$) 146.

The switch unit 190 connects or isolates the second squib loop from the test circuit. The switch unit 190 may include a first switch 192 configured to connect or isolate the test circuit (e.g. the current source 200) from the high side feed terminal (SF$_x$) 143 of the second squib loop. The switch unit 190 may include a second switch 194 configured to connect or isolate the test circuit (e.g. the first input of the comparator 206) from the high side feed terminal (SF$_x$) 145. The switch unit 190 may include a third switch 196 configured to connect or isolate the test circuit (e.g. the second input of the amplifier 206) from the low side return terminal (SR$_y$) 145. The switch unit 190 may include a fourth switch 198 configured to connect or isolate the test circuit (e.g. the current source 202) from a low side return terminal (SR$_y$) 145.

The switch unit 180 connects or isolates the high side feed terminal (SF$_y$) 144 from the test circuit. The switch unit 180 may include a first switch 182 that connects or isolates the high side feed terminal (SF$_y$) 144 from the second input of the amplifier 206. The switch unit 180 may include a second switch 184 that connects or isolates the high side feed terminal (SF$_y$) 144 from the second current source 202.

The amplifier circuit 204 includes the amplifier 206, resistors 208, 212, 214, 216 along with reference voltage (210). The amplifier 206 has a first input that may be connected to switches 164 and 194 through resistor 208. The first input may also be connected to a reference voltage source 210 through resistor 212. The amplifier 206 has a second input that may be connected to switches 166, 182, and 196 through resistor 214. Resistor 216 may be connected to provide feedback from the output of comparator 206 to the second input of amplifier 206. The output of the amplifier may be connected to an analog to digital converter 220. A reference voltage is provided to the analog to digital converter 220 by reference supply 218. The measurements from the analog to digital converter 220 are provided to the digital control circuit 120.

Figure 2:
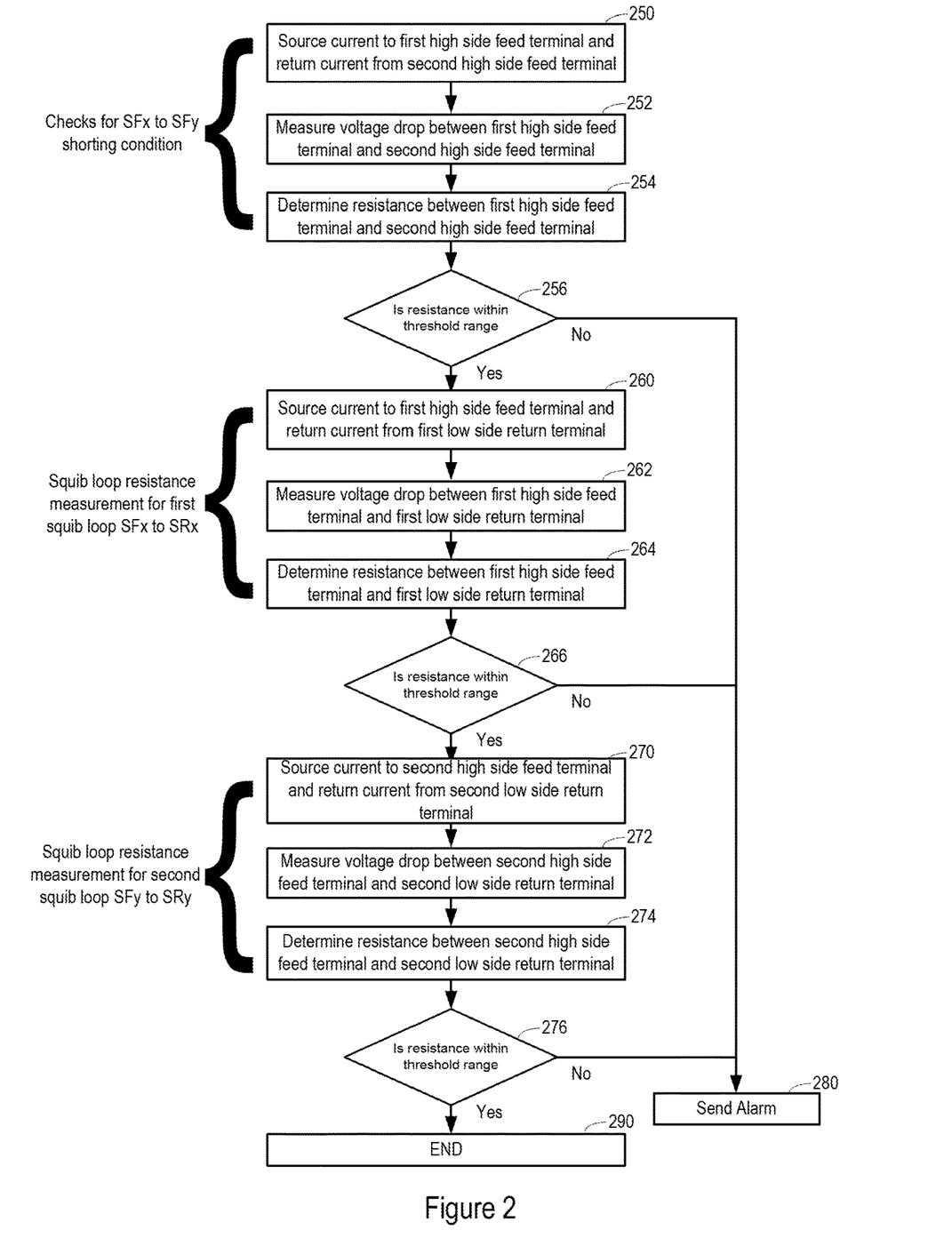
FIG. 2 is a method for diagnosis of squib loop resistance in a dual squib with a common return line.

FIG. 2 is a method for providing diagnose of squib loop resistance in a dual squib with a common return line. One implementation of the method contains three (3) major diagnostic measurements. Firstly is a method to measure the squib loop resistance from SF$_x$ to SF$_y$ which starts in block 250. Secondly is a method to measure the individual squib loop resistance from SF$_x$ to SR$_x$ of the first common connected squib loop channel, which starts in block 260. Thirdly, is a method to measure the individual squib loop resistance from SF$_y$ to SR$_y$ of the second common connected squib loop channel, which starts in block 270.

In more detail, the proposed implementation of the method begins in block 250. Source current is provided to the first high side feed terminal of the first squib loop and returned from the second high side feed terminal in block 250. For example, a current source may be connected to the first high side feed terminal and a current sink may be connected to the second high side feed terminal. The voltage drop between the first high side feed terminal and the second high side feed terminal may be measured in block 252. From the voltage measurement and the current provided, the resistance can be determined between the first high side feed terminal and the second high side feed terminal in block 254. If the resistance or voltage are outside a threshold range (e.g. above an upper threshold or below a lower threshold) as determined in block 256 then an alarm may be triggered and a message may be sent by the control circuitry in block 280.

Then optionally, each loop may be independently diagnosed for squib loop resistance. The first step is to diagnose the first squib loop resistance SF$_x$ to SR$_x$. In block 260, source current is provided to the high side feed terminal of the first squib loop and returned from the low side return terminal of the first squib loop. For example, a current source may be connected to the high side feed terminal and a current sink may be connected to the low side return terminal. The voltage drop between the high side feed terminal and the low side return terminal of the first squib may be measured in block 262. From the voltage measurement and the current provided, the resistance can be determined between the high side feed terminal and the low side return terminal of the first squib loop in block 264. If the resistance or voltage are outside a threshold range (e.g. above an upper threshold or below a lower threshold) as determined in block 266 then an alarm may be triggered and a message may be sent by the control circuitry in block 280.

Continuing the individual squib loop resistance diagnoses, the second step is to diagnose the second squib loop resistance SF$_y$ to SR$_y$. In block 270, source current is provided to the high side feed terminal of the second squib loop and returned from the low side return terminal of the second squib loop. For example, a current source may be connected to the high side feed terminal and a current sink may be connected to the low side return terminal. The voltage drop between the high side feed terminal and the low side return terminal of the first squib may be measured in block 272. From the voltage measurement and the current provided, the resistance can be determined between the high side feed terminal and the low side return terminal of the second squib loop in block 274. If the resistance or voltage are outside a threshold range (e.g. above an upper threshold or below a lower threshold) as determined in block 276 then an alarm may be triggered and a message may be sent by the control circuitry in block 280. If the resistance and/or voltage are within the threshold range then the method may end in block 290.

Figure 3:
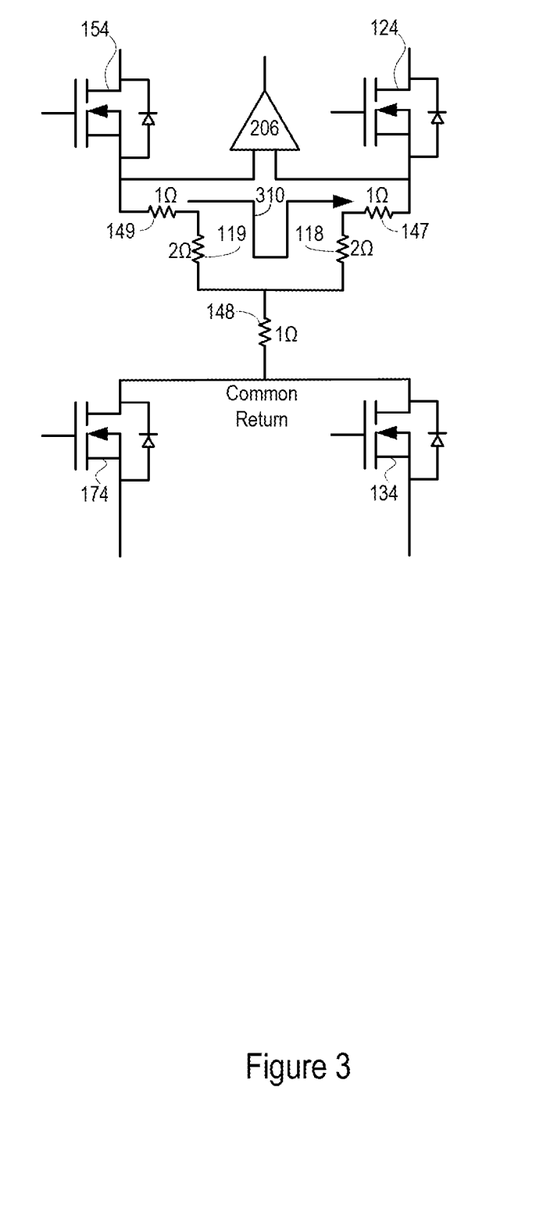
FIG. 3 is a simplified schematic view of a squib driver circuit for diagnosis of squib loop resistance in a dual squib with a common return line.

FIG. 3 is a simplified schematic view of a squib driver circuit for diagnosing squib loop resistance in a dual squib with a common return line. In this simplified illustration, exemplary values are provided for the wire resistances and the squib resistance. In this example, the resistances in the current path 310 are wire resistances 149, 147 and squib resistances 119, 118. These resistances total 6 ohms. This can be compared to the path through an independent squib loop (e.g. wire resistances 149, 148 and squib resistance 119) which only totals 4 ohms. Therefore, the dynamic range is increased since any leakage resistance will cause a greater overall resistance change from the expected values.

Figure 4:
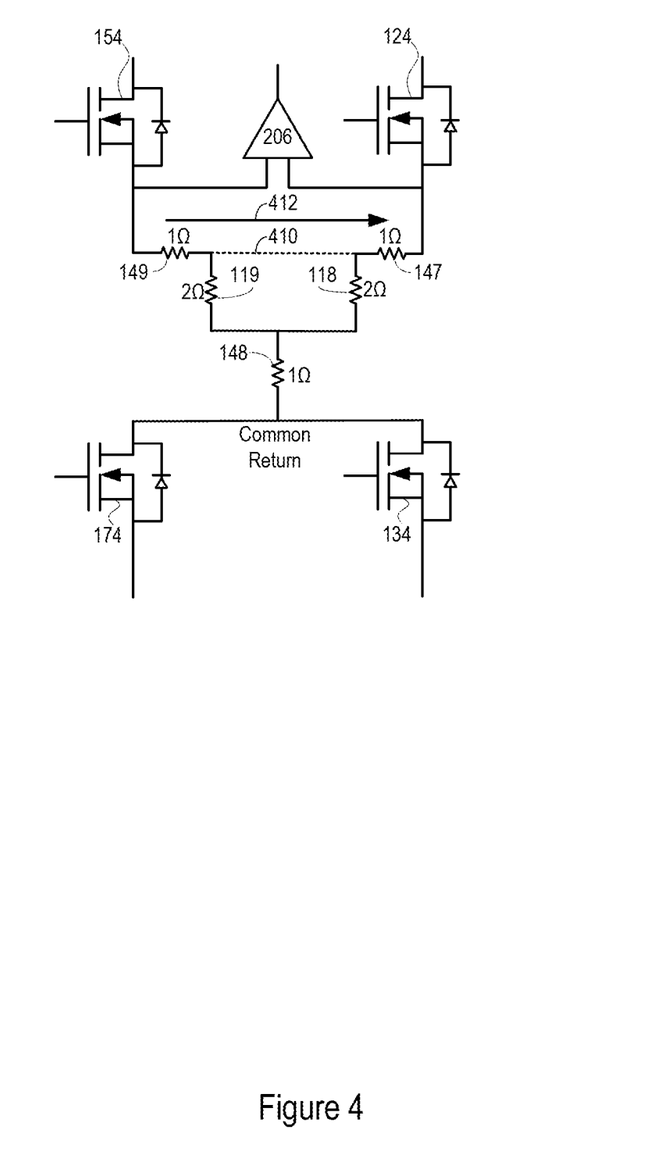
FIG. 4 is a simplified schematic view of a squib driver circuit for diagnosis of squib loop resistance in a dual squib with a common return line and a short condition.

FIG. 4 is a simplified schematic view of a squib driver circuit for diagnosing squib loop resistance in a dual squib with a common return line with a a fault of a short circuit condition. This diagram shows a simulated short 410 in the squib end of the wire harness. Here it can be seen that the current path 412 only includes the wire resistances 149 and 147. The resistances through current path 412 total 2 ohms instead of an expected 6 ohms which causes a greater percentage drop than if the independent loop was tested (e.g. 2 ohms out of an expected 4 ohms).

Figure 5:
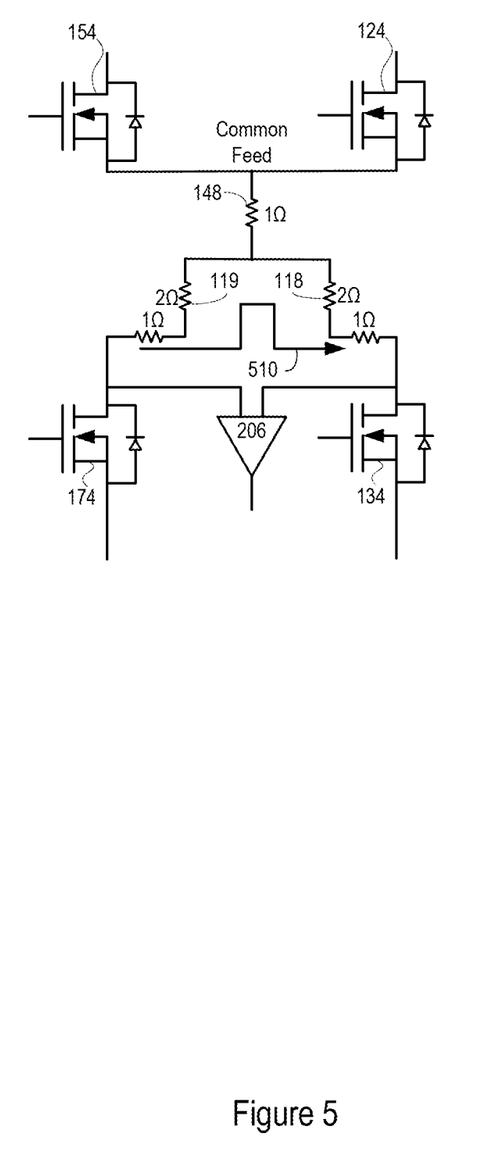
FIG. 5 is a simplified schematic view of a squib driver circuit for diagnosis of squib loop resistance in a dual squib with a common feed line.

FIG. 5 is a simplified schematic view of a squib driver circuit for diagnosing squib loop resistance in a dual squib with a common feed line. It is also contemplated that the diagnostic could be performed on a squib loop circuit that uses a common feed line instead of a common return line. The current can be sourced to the to a first low side return line of a first squib loop and returned through a second low side return line of a second squib loop. Accordingly, the result would be similar FIG. 3 where the resultant wire resistances and squib resistances through current path 501 would total 6 ohms rather than a total of 4 ohms that would be provided through a single independent squib loop. The voltage drop would then be measured between the first low side return line of the first squib loop and the second low side return line of the second squib loop. If the voltage does not fall within a threshold range (e.g. above an upper threshold or below a lower threshold) then an alarm may be triggered and a message may be sent by the control circuitry.

Figure 6:
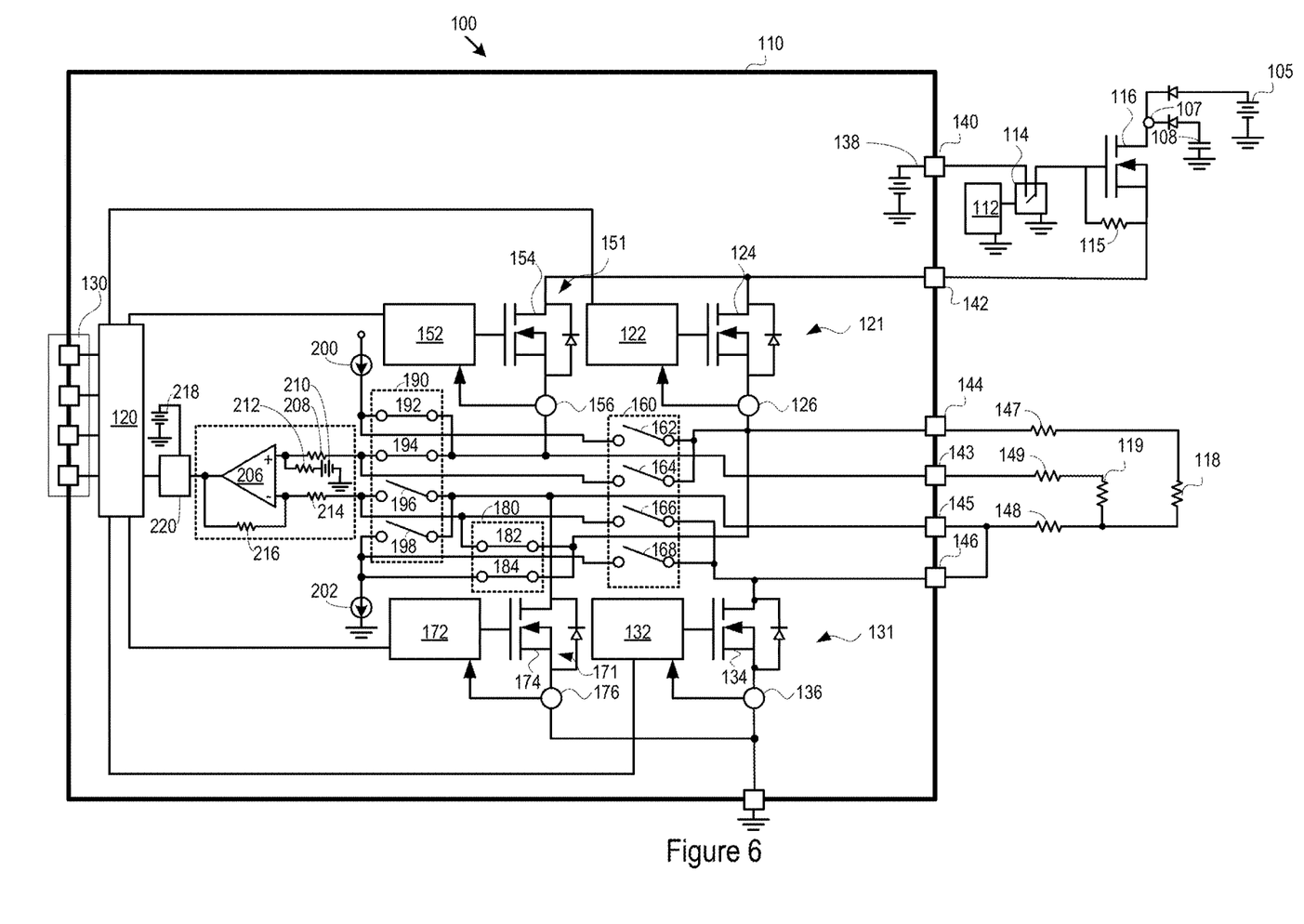
FIG. 6 is a schematic view of a squib driver circuit configured to supply current to a first high side feed terminal and return current through a second high side feed terminal.

FIG. 6 is a schematic view of a squib driver circuit configured to supply current to a first high side feed terminal 143 ($SF_x$) and return current through a second high side feed terminal 144 ($SF_y$). In this configuration, switches 192, 194, 182, and 184 are closed. The voltage drop can then be measured between the first high side feed terminal ($SF_x$) 143 of the first squib loop and a second high side feed terminal ($SF_y$) 144 of the second squib loop. If the voltage does not fall within a threshold range (e.g. above an upper threshold or below a lower threshold) then an alarm may be triggered and a message may be sent by the control circuitry 120.

Figure 7:
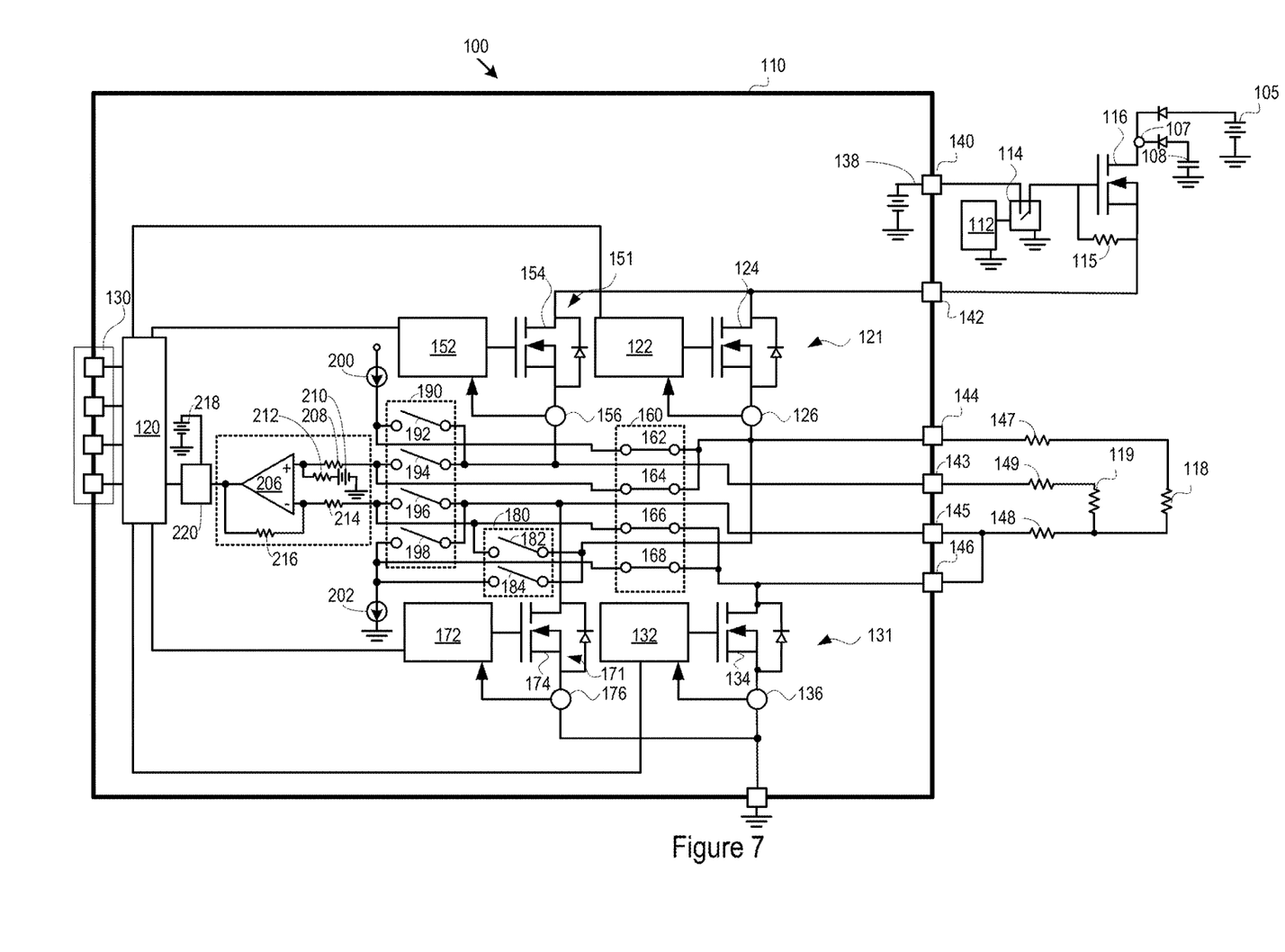
FIG. 7 is a schematic view of a squib driver circuit configured to supply current to a first high side feed terminal and return current through a first low side return terminal.

FIG. 7 is a schematic view of a squib driver circuit configured to supply current to a first high side feed terminal 144 ($SF_y$) and return current through a first low side return terminal 146 ($SR_y$). In this configuration, switches 162, 164, 166, and 168 are closed. The voltage drop can then be measured between the first high side feed terminal ($SF_y$) 144 of the first squib loop and the first low side return terminal ($SR_y$) 146 of the first squib loop. If the voltage does not fall within a threshold range (e.g. above an upper threshold or below a lower threshold) then an alarm may be triggered and a message may be sent by the control circuitry 120.

Figure 8:
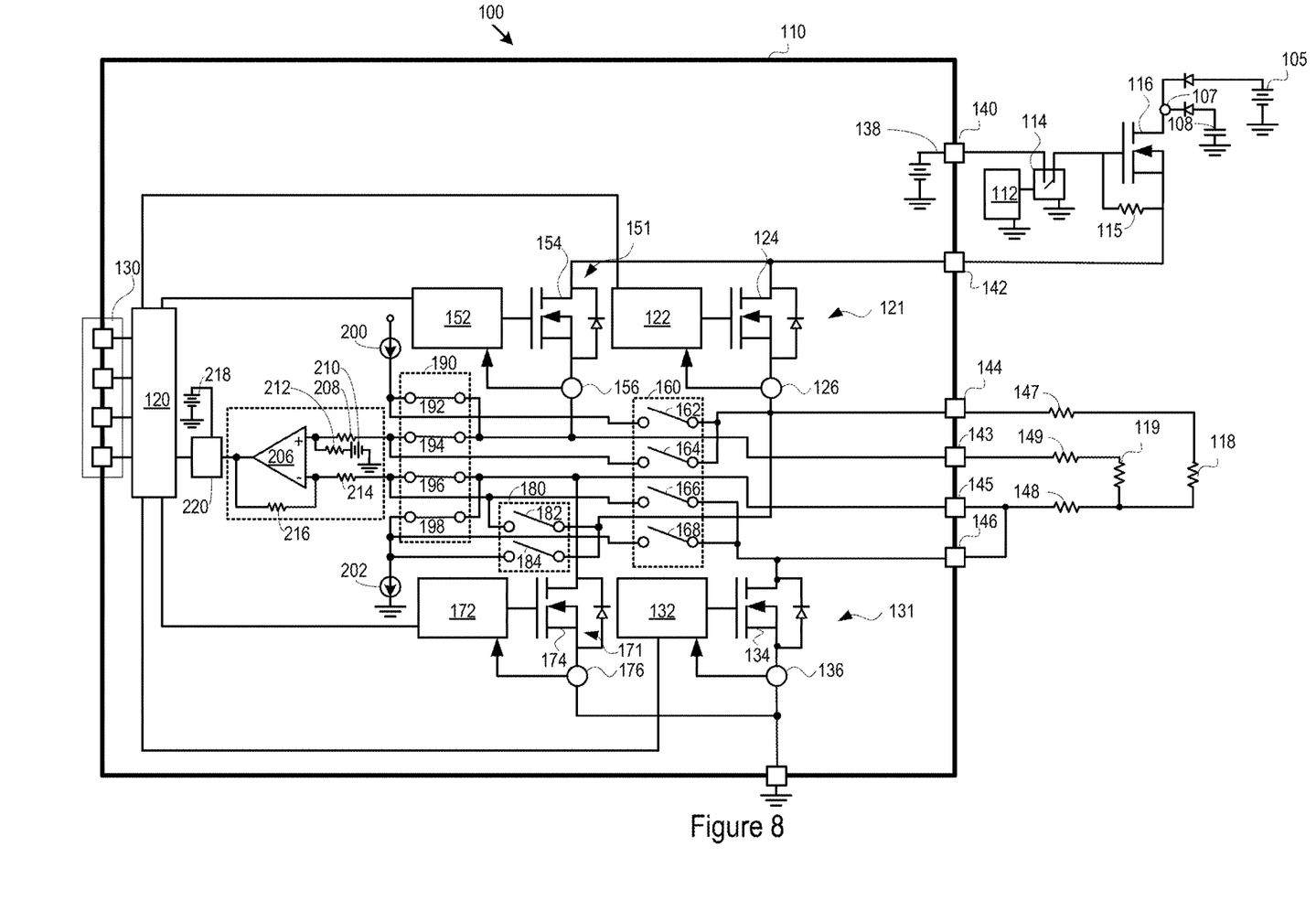
FIG. 8 is a schematic view of a squib driver circuit configured to supply current to a second high side feed terminal and return current through a second low side return terminal.

FIG. 8 is a schematic view of a squib driver circuit configured to supply current to a second high side feed terminal 143 ($SF_x$) and return current through a second low side return terminal 145 ($SR_x$). In this configuration, switches 192, 194, 196, and 198 are closed. The voltage drop can then be measured between the high side feed terminal ($SF_x$) 143 of the second squib loop and the low side return terminal ($SR_x$) 145 of the second squib loop. If the voltage does not fall within a threshold range (e.g. above an upper threshold or below a lower threshold) then an alarm may be triggered and a message may be sent by the control circuitry 120.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

As a person skilled in the art will readily appreciate, the above description is meant as an illustration of the principles of this disclosure. This description is not intended to limit the scope or application of this disclosure in that the systems and methods are susceptible to modification, variation and change, without departing from spirit of this disclosure, as defined in the following claims.

The invention claimed is:

1. A system for diagnosing leakage in a dual squib loop with a common return line, the system comprising;
   a first high side driver connected to a firing voltage source and a first feed terminal for the first squib loop;
   a first low side driver connected to a first return terminal for the first squib loop and a ground;
   a second high side driver connected to the firing voltage source and a second feed terminal for second first squib loop;
   a second low side driver connected to a second return terminal for the second squib loop and the ground;
   a testing current source being connected to source current to the first feed terminal for the first squib loop and return current through the second feed terminal for the second squib loop;
   a voltage measurement circuit configured to measure a voltage between the first feed terminal and the second feed terminal.

2. The system according to claim 1, wherein a first switch is configured to connect or isolate the test current source from the first feed terminal.

3. The system according to claim 2, wherein a second switch is configured to connect or isolate a current sink from the second feed terminal.

4. The system according to claim 2, wherein a third switch is configured to connect or isolate the voltage measurement circuit from the first feed terminal.

5. The system according to claim 4, wherein a fourth switch is configured to connect or isolate the voltage measurement circuit from the second feed terminal.

6. The system according to claim 2, wherein a fifth switch is configured to connect or isolate the current sink from the first return terminal.

7. The system according to claim 2, wherein a sixth switch is configured to connect or isolate the current source from the second feed terminal.

8. The system according to claim 2, wherein a seventh switch is configured to connect or isolate the current sink from the second return terminal.

9. The system according to claim 1, wherein control circuitry is configured to trigger an alarm when the voltage between the first feed terminal and the second feed terminal exceed a threshold value.

10. A system for diagnosing leakage in a dual squib loop with a common feed line, the system comprising;
    a first high side driver connected to a firing voltage source and a first feed terminal for the first squib loop;
    a first low side driver connected to a first return terminal for the first squib loop and a ground;
    a second high side driver connected to the firing voltage source and a second feed terminal for second squib loop;
    a second low side driver connected to a second return terminal for the second squib loop and the ground;
    a testing current source being connected to source current to the first return terminal for the first squib loop and return current through the second return terminal for the second squib loop;
    a voltage measurement unit configured to measure a voltage between the first return terminal and the second return terminal.

11. The system according to claim 1, wherein a first switch is configured to connect or isolate the test current source from the first return terminal.

12. The system according to claim 11, wherein a second switch is configured to connect or isolate a current sink from the second return terminal.

13. The system according to claim 11, wherein a third switch is configured to connect or isolate the voltage measurement circuit from the first return terminal.

14. The system according to claim 13, wherein a fourth switch is configured to connect or isolate the voltage measurement circuit from the second return terminal.

15. The system according to claim 10, wherein control circuitry is configured to trigger an alarm when the voltage between the first return terminal and the second return terminal exceed a threshold value.

* * * * *